(12) United States Patent
Yoshida et al.

(10) Patent No.: US 6,854,574 B2
(45) Date of Patent: Feb. 15, 2005

(54) SHOCK ABSORBER

(75) Inventors: Hiroshi Yoshida, Soja (JP); Hiroshi Goto, Soja (JP); Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 10/430,451

(22) Filed: May 6, 2003

(65) Prior Publication Data

US 2003/0222477 A1 Dec. 4, 2003

(30) Foreign Application Priority Data

May 29, 2002 (JP) ....................................... 2002-156230

(51) Int. Cl.⁷ .................................................. F16F 7/12
(52) U.S. Cl. .................. 188/371; 267/139; 296/187.03; 293/133
(58) Field of Search ................................ 188/371, 372, 188/376, 377; 267/139; 296/187.03, 187.09, 203.01, 203.02; 293/133, 132, 136

(56) References Cited

U.S. PATENT DOCUMENTS

| | | | | |
|---|---|---|---|---|
| 3,146,014 A | * | 8/1964 | Kroell | ........................ 293/133 |
| 3,511,345 A | * | 5/1970 | Takamatsu et al. | ......... 188/371 |
| 3,599,757 A | * | 8/1971 | Takamatsu et al. | ......... 188/371 |
| 3,998,485 A | | 12/1976 | Putter et al. | |
| 6,189,941 B1 | * | 2/2001 | Nohr | .......................... 293/118 |
| 6,312,028 B1 | | 11/2001 | Wilkosz | |
| 6,386,347 B1 | * | 5/2002 | Reynaert | .................... 188/377 |
| 6,554,333 B2 | * | 4/2003 | Shimotsu et al. | .......... 293/132 |
| 6,702,345 B1 | * | 3/2004 | Yoshida | ..................... 293/133 |

FOREIGN PATENT DOCUMENTS

| | | |
|---|---|---|
| JP | 47-45986 | 11/1972 |
| JP | 51-21850 | 7/1976 |
| JP | 2984434 | 9/1999 |
| JP | 2001-138841 | 5/2001 |
| JP | 2001-204841 | 7/2001 |
| JP | 2001-241478 | 9/2001 |

* cited by examiner

*Primary Examiner*—Pam Rodriguez
(74) *Attorney, Agent, or Firm*—Koda & Androlia

(57) ABSTRACT

A shock absorber as being of a bumper supporting member and a shock absorber as being of a side member, which retain the sinking motion of a smaller-diameter tube portion into a larger-diameter tube portion even if an impact is applied at a larger angle obliquely of an axial direction, thereby to achieve the absorption of the impact energy by a plastic deformation. A plastically deformable straight tube is partially reduced or partially enlarged to form a smaller-diameter tube portion and a larger-diameter tube portion, which join to each other through a step portion. The step portion is formed by joining a folded-back portion of the smaller-diameter tube portion and a folded-back portion of the larger-diameter tube portion, which have circular arc-shaped sections having arcuate angles more than 90 degrees.

4 Claims, 18 Drawing Sheets

SHOCK ABSORBER

BACKGROUND OF THE INVENTION

1. Field of the Invention

The present invention relates to a shock absorber for absorbing an impact energy as a plastic deformation-generating energy and, more particularly, to a shock absorber adapted to be used either as a side member constructing a vehicle frame member side portion of an automobile or as a bumper supporting member for absorbing the impact energy applied to the bumper of the automobile thereby to prevent or retain the transmission of the impact energy to the vehicle frame member.

2. Description of the Related Art

In a vehicle such as an automobile, shock absorbers are used at many portions for absorbing the impact energy as the plastic deformation-generating energy so as to protect the passenger against an impact when the vehicle collides. For example, the shock absorber (as will be called the "shock absorber as being of a bumper supporting member") is used as the bumper supporting member, which includes tubular bodies for supporting the bumper reinforcement of the vehicle against the vehicle frame member.

In the shock absorber of the bumper supporting member to be used as the shock absorber, as disclosed in JP-B-47-045986 or JP-A-2001-138841, a smaller-diameter tube portion is pushed into a larger-diameter tube portion by an impact energy in the axial direction (i.e., in the arranging direction of the smaller-diameter tube portion and the larger-diameter tube portion, as usually identical to the longitudinal direction of the vehicle) to cause the plastic deformation so that the impact energy is absorbed the plastic deformation-generating energy. The shock absorber as the bumper supporting member is advantageous in that it is excellent in the performance of absorbing the impact energy despite of its simple structure, and in that the design of the shock absorber can be flexible to be modified according to the change in the vehicle weight.

Moreover, the shock absorber (hereinafter called "shock absorber as being of a side member") is used in the side member, which is constructed, as the vehicle frame member for holding a passenger compartment, of tubular bodies forming the vehicle frame member side portion of the vehicle. The related art using the shock absorber in the side member is disclosed in JP-A-2001-241478, Japanese Patent No. 2984434, JP-B-51-021850, U.S. Pat. Nos. 3,998,485 and 6,312,028.

JP-A-2001-241478 discloses the concept, in which two tubular members are caused to abut coaxially at their end portions against each other so that the impact is absorbed by the plastic deformation (as referred to 1 in FIG. 3) of the inward distortions of the end portions of the two tubular members. Japanese Patent No. 2984434 discloses the impact absorbing frame for the vehicle, in which a plurality of holes are arranged to the side surfaces of the frame in longitudinal direction to be adjustable to the range of the plastic deformation by the number of the holes arranged in accordance with the degree of the impact. JP-B-51-021850 discloses the concept, in which the structure is made of a material having a relatively low rigidity and in which the bracket is installed at the inside intermittently. U.S. Pat. No. 3,998,485 discloses a concept, in which a multi-stepped cylinder is joined symmetrically. And, U.S. Pat. No. 6,312,028 discloses a concept, in which shack absorbing members having slender holes or cavities are interposed as a portion of thin structure of a aide member.

The individual shock absorbers disclosed in the aforementioned individual related arts have an action to absorb the impact energy as the deformation energy by causing the plastic deformation with the impact. This action is basically unchanged between the shock absorber of the bumper supporting member and the shock absorber of the side member. For this unchanged action, therefore, it is desirable that the shock absorber is plastically deformed in a stable manner, and it is necessary that the shock absorber is not inclined especially even if an offset load is applied and that the plastic deformation is correctly caused.

The shock absorber of the bumper supporting member disclosed in JP-B-47-045986 can exhibit a necessary and sufficient absorbing performance in case the impact is applied in the axial direction that the smaller-diameter tube portion and the larger-diameter tube portion are arranged. However, the step portion as being formed at a boundary portion between the smaller-diameter tube portion and the larger-diameter tube portion is made easy in the plastic deformation. Accordingly, in the case that the impact is applied obliquely from the axial direction to the smaller-diameter tube portion, the smaller-diameter tube portion is inclined by the transverse component fh of the impact so that the plastic deformation is not caused by the sinking motion of the smaller-diameter tube portion into the larger-diameter tube portion. Thus, there arises a problem that the impact energy cannot be absorbed.

In the shock absorber as the bumper supporting member disclosed in JP-A-2001-138841 the inclination of the smaller-diameter tube portion is prevented or retained by the shock absorber having a three-steps construction with the smaller-diameter tube portion, the intermediate-diameter tube portion and the larger-diameter tube portion. However, the action to prevent or to retain the inclination of the smaller-diameter tube portion utilized by the intermediate-diameter tube portion is restrictive (up to about 30 degrees in the axial direction) so that the prevention of the inclination of the smaller-diameter tube portion cannot be sufficiently achieved against an impact at a larger angle obliquely of the axial direction.

In the shock absorber as the side member of JP-A-2001-241478, on the other hand, the edge of the smaller-diameter tubular member abuts against the flat surface of the step portion formed on the edge of the larger-diameter tubular member. Therefore, the impact being applied in the axial direction of the array of the tubular members can be absorbed by plastic deformation at the edges of the two tubular members through the step portion flat surface. In the case of the offset load, however, there arises a problem that the smaller-diameter tubular member is inclined and bent on the step portion flat surface.

In addition, the shock absorbers as the side member disclosed in Japanese Patent No. 2984434, JP-B-51-021850 and U.S. Pat. No. 6,312,028 can hardly achieve the stable shock absorbing performance, and the shock absorber as the side member disclosed in U.S. Pat. No. 3,998,485 may possibly be bent by the offset load, as well as shown in JP-A-2001-241478.

Therefore, the present inventors have investigated shock absorbers as bumper supporting members or side members of a vehicle to achieve the absorption of impact energy utilizing the plastic deformation of the sinking motion of a smaller-diameter tube portion into a larger-diameter tube portion, even if the impact is applied at a large angle obliquely to the axial direction.

SUMMARY OF THE INVENTION

According to an aspect of the invention, there is provided a shock absorber comprising a smaller-diameter tube portion and a larger-diameter tube portion integrally formed by partially reducing or partially enlarging a plastically deformable straight tube and a step portion that joins the smaller-diameter tube portion and the larger-diameter tube portion, wherein both a folded-back portion of the smaller-diameter tube portion and a folded-back portion of the larger-diameter tube portion, as joining to each other through the step portion, have a circular arc-shaped section with an arcuate angle more than 90 degrees, and wherein the step portion is formed to have an S-shaped section by joining the folded-back portion of the smaller-diameter tube portion and the folded-back portion of the larger-diameter tube portion.

The phrase "more than 90 degrees", as defined herein, means that either the angular range of the circular arc-shaped portion of the folded-back portion of the smaller-diameter tube portion formed by folding the side surface of the smaller-diameter tube portion toward the step portion, or the angular range of the circular arc-shaped portion of the folded-back portion of the larger-diameter tube portion formed by folding the side surface of the larger-diameter tube portion toward the step portion is not 90 degrees (nor a right angle).

Here, if the straight tube is a side member made of a tube portion constructing the side portion of the vehicle frame member, the shock absorber is of the side member. If the straight tube is a bumper supporting member made of a tube portion for supporting the bumper reinforcement of a vehicle with respect to a vehicle frame member, the shock absorber is of the bumper supporting member.

The shock absorber of the present invention can be applied to a multi-step tube portion having one or more step portion but is preferably applied to a two-step tube portion composed of a smaller-diameter tube portion and a larger-diameter tube portion, or a three-step tube portion composed of a smaller-diameter tube portion, an intermediate-diameter tube portion and a larger-diameter tube portion. Here, this three-step tube portion is constructed as a whole by connecting the shock absorbers having the two-step tube portion, i.e., the smaller-diameter tube portion of the shock absorber having the three-step tube portion corresponds to the smaller-diameter tube portion of the shock absorber having the two-step tube portion; the intermediate-diameter tube portion of the shock absorber having the three-step tube portion corresponds to the combination of the larger-diameter tube portion and the other smaller-diameter tube portions of the shock absorbers having two-step tube portions; and the larger-diameter tube portion of the shock absorber having the three-step tube portion corresponds to the other larger-diameter tube portion of the shock absorbers having the two-step tube portion.

The shock absorber of the present invention forms the smaller-diameter tube portion or the larger-diameter tube portion obtained by partially reducing or partially enlarging a plastically deformable straight tube. Therefore, the wall thickness of the larger-diameter tube portion in the present invention is thinner than the wall thickness of the smaller-diameter tube portion so that the larger-diameter tube portion can be plastically deformed in an easier manner. Moreover, the step portion interposed between the smaller-diameter tube portion and the larger-diameter tube portion is formed into such an S-shaped section that the smaller-diameter tube portion slightly sinks into the larger-diameter tube portion and that the step portion is inward distorted, so that the smaller-diameter tube portion can be smoothly inserted into the larger-diameter tube portion.

In the shock absorber of the invention thus constructed, the smaller-diameter tube portion sinks as it is into the larger-diameter tube portion to cause the plastic deformation, by which the folded-back portion of the larger-diameter tube portion is turned inwardly from the step portion to the side surface of the larger-diameter tube portion, so that the impact energy is absorbed as the plastic deformation-generating energy.

The arcuate angle of the individual circular arc-shaped sections of the folded-back portion of the smaller-diameter tube portion and the folded-back portion of the larger-diameter tube portion can be considered to range more than 90 degrees and less than 360 degrees. The specific arcuate angle is determined; (1) according to the difference between the external diameter of the smaller-diameter tube portion and the internal diameter of the larger-diameter tube portion; and (2) according to the difference between the radius (as will be defined hereinafter) of the circular arc-shaped section of the folded-back portion of the smaller-diameter tube portion and the circular arc-shaped section of the folded-back portion of the larger-diameter tube portion. More specifically, the individual arcuate angles of the circular arc-shaped sections of both folded-back portions are preferred to be around 180 degrees.

In order to ensure the plastic deformation in which the smaller-diameter tube portion sinks as it is into the larger-diameter tube portion and the folded-back portion of the larger-diameter tube portion is turned inward from the step portion to the side surface of the larger-diameter tube portion, the step portion is formed to have the S-shaped section, in which the radius of the circular arc-shaped section of the folded-back portion of the smaller-diameter tube portion is made smaller than that of the circular arc-shaped section of the folded-back portion of the larger-diameter tube portion. The folded-back portions of the smaller-diameter and larger-diameter tube portions merging into the side surfaces of the different thickness of the smaller-diameter and larger-diameter tube portions are curved while changing their thickness individually. Therefore, the radius of the individual circular arc-shaped sections are taken from the center lines of the individual thickness.

The step portion having the aforementioned sectional structure restrains the distortion of the side surface of the smaller-diameter tube portion through the folded-back portion where the smaller-diameter tube portion is more sharply folded back, but induces the distortion of the side surface of the larger-diameter tube portion through the folded-back portion where the larger-diameter tube portion is more gently folded back. As a result, the smaller-diameter tube portion can sink as it is into the larger-diameter tube portion to realize the plastic deformation in which the portion from the folded-back portion to the side surface of the larger-diameter tube portion is turned inwardly.

The present invention realizes the plastic deformation, in which the smaller-diameter tube portion never fails to sink into the larger-diameter tube portion, as described above, by devising the structure of the step portion. In case an impact (or an offset load) is applied in an oblique direction to the smaller-diameter tube portion, however, the smaller-diameter tube portion may be inclined with respect to the larger-diameter tube portion, and the side surface of the smaller-diameter tube portion may abut against the folded-back portion of the larger-diameter tube portion to block the sinking motion of the smaller-diameter tube portion.

It is, therefore, advisable that the step portion is formed to have an S-shaped section by joining the folded-back portion of the smaller-diameter tube portion and the folded-back portion of the larger-diameter tube portion through an annular side surface. The individual radius of the circular arc-shaped sections of the folded-back portion of the smaller-diameter tube portion and the folded-back portion of the larger-diameter tube portion may have equal or different. Even in case the radius of the circular arc-shaped section of the folded-back portion of the smaller-diameter tube portion is made smaller than that of the circular arc-shaped section of the folded-back portion of the larger-diameter tube portion, as described above, the annular side surface does not raise an element for causing the distortion.

In case the step portion is formed to have the S-shaped section joining the folded-back portion of the smaller-diameter tube portion and the folded-back portion of the larger-diameter tube portion having equal arcuate angles of 180 degrees, the annular side surface is parallel to the side surface of the smaller-diameter tube portion and the side surface of the larger-diameter tube portion. It is, however, preferable that the radius of the individual circular arc-shaped sections of the folded-back portions of the smaller-diameter and larger-diameter tube portions are made different to form the annular side surface into the conical annular side surface which is gradually reduced or gradually enlarged in diameter from the smaller-diameter tube portion to the larger-diameter tube portion. More preferably, the step portion is formed into a step portion having an S-shaped section, in which the radius of the circular arc-shaped section of the folded-back portion of the smaller-diameter tube portion is made smaller than that of the circular arc-shaped section of the folded-back portion of the larger-diameter tube portion, thereby to form an annular side surface of an inverted conical shape opened toward the smaller-diameter tube portion.

The annular side surface joining the folded-back portion of the smaller-diameter tube portion and the folded-back portion of the larger-diameter tube portion places the folded-back portion of the smaller-diameter tube portion acting as the axis of inclination apart from the folded-back portion of the larger-diameter tube portion, in case the smaller-diameter tube portion is inclined by an impact in an oblique direction. At an early stage, therefore, the side surface of the smaller-diameter tube portion is caused to abut against the folded-back portion of the larger-diameter tube portion or the annular side surface thereby to prevent a large inclination of the smaller-diameter tube portion. At the stage where the smaller-diameter tube portion begins to sink into the larger-diameter tube portion, moreover, the inclination of the smaller-diameter tube portion is corrected while the side surface of the smaller-diameter tube portion being held in sliding contact with the folded-back portion of the larger-diameter tube portion or the annular side surface, thereby to ensure the sinking motion of the smaller-diameter tube portion into the larger-diameter tube portion.

In order to prevent the inclination of the smaller-diameter tube portion more positively, it is advisable that the smaller-diameter tube portion includes a guiding member fixed on its inner surface for retaining or preventing the inclination of the smaller-diameter tube portion when the smaller-diameter tube portion sinks into the larger-diameter tube portion. This guiding member has a smaller-diameter annular guiding portion having an external diameter equal to the internal diameter of the smaller-diameter tube portion and a larger-diameter annular guiding portion having an external diameter equal to the internal diameter of the larger-diameter tube portion. The smaller-diameter annular guiding portion is fixed on the inner surface of the smaller-diameter tube portion and protruding across the step portion from the smaller-diameter tube portion into the larger-diameter tube portion, and the larger-diameter annular guiding portion contacts to the inner surface of the larger-diameter tube portion at a position where the smaller-diameter annular guiding portion crosses the step portion. Therefore, the guiding member integrated with the smaller-diameter tube portion resists to the impact applied obliquely of the axial direction to the smaller-diameter tube portion on the basis of the inner surface of the larger-diameter tube portion thereby to prevent or to retain the inclination of the smaller-diameter tube portion.

Here, the phrase "contacts to the inner surface of the larger-diameter tube portion" contains the case in which when the smaller-diameter tube portion sinks into the larger-diameter tube portion, the larger-diameter annular guiding portion comes into continuous or intermittent point, linear or facial contact with the inner surface of the larger-diameter tube portion. Moreover, the larger-diameter annular guiding portion need not contact as a whole, but may make either a plurality of point contacts in the direction to prevent the inclination of the smaller-diameter tube portion or an intermittent linear or facial contact in the circumferential direction.

In order that the guiding member may exhibit the function to restrain or prevent the inclination of the smaller-diameter tube portion itself to sink into the larger-diameter tube portion, it is necessary that the smaller-diameter tube portion sinks smoothly into the larger-diameter tube portion. It is, therefore, desirable to apply the guiding member and to form the step portion having the S-shaped section, in which the radius of the circular arc-shaped section of the folded-back portion of the smaller-diameter tube portion is made smaller than that of the circular arc-shaped section of the folded-back portion of the larger-diameter tube portion.

The smaller-diameter annular guiding portion and the larger-diameter annular guiding portion constructing the aforementioned guiding member may be made of separate members or may be integrally shaped through the step portion by partially reducing or partially enlarging a plastically deformable annular member as in the stepped tube portion to construct the shock absorber. In this case, the smaller-diameter annular guiding portion corresponds to the smaller-diameter tube portion, and the larger-diameter annular guiding portion corresponds to the larger-diameter tube portion. However, the guiding member needs no shock absorbing action due to the plastic deformation so that the step portion joining the smaller-diameter annular guiding portion and the larger-diameter annular guiding portion needs none of the structural restrictions thus far described.

It is advisable that the guiding member, as integrally formed through the step portion by partially reducing or partially enlarging the elastically deformable annular member, forms the larger-diameter annular guiding portion by enlarging the smaller-diameter annular guiding portion protruding from the smaller-diameter tube portion into the larger-diameter tube portion so much as it contacts to the inner surface of the larger-diameter tube portion. In other words, the smaller-diameter annular guiding portion is formed into the relatively long tubular shape, and its edge portion is diametrically enlarged to contact to the inner surface of the larger-diameter tube portion.

Moreover, it is advisable that the guiding member forms the larger-diameter annular guiding portion as an annular outward-curled edge portion by curling back the smaller-diameter annular guiding portion protruding from the smaller-diameter tube portion into the larger-diameter tube portion toward the smaller-diameter tube portion so much as to contact to the inner surface of the larger-diameter tube portion. Either, the guiding member forms the larger-diameter annular guiding portion as an annular folded-inward edge portion by expanding the smaller-diameter annular guiding portion protruding from the smaller-diameter tube portion into the larger-diameter tube portion so much as to contact to the inner surface of the larger-diameter tube and by folding back the smaller-diameter annular guiding portion radially inward of the larger-diameter tube portion. By thus curling to construct the larger-diameter annular guiding portion, the structural strength resisting to the impact applied obliquely of the axial direction can be given to the larger-diameter annular guiding portion.

Moreover, it is advisable that the guiding member has a tubular ring portion formed in the larger-diameter annular guiding portion and contacting with the inner surface of the larger-diameter tube portion. The tubular ring portion to contact with the inner surface of the larger-diameter tube portion over a wide area lowers the pressure (i.e., the impulsive force/the contact area) due to the impact applied obliquely of the axial direction, thereby to intensify the action of the guiding member to prevent or retain the inclination of the smaller-diameter tube portion. This tubular ring portion basically takes a shape similar to that of the larger-diameter tube portion because it contacts with the inner surface of the larger-diameter tube portion. It is advisable that the aforementioned annular folded-inward edge portion is formed at the edge portion of the tubular ring portion.

The guiding member of the present invention may be able to resist to the inclination of the smaller-diameter tube portion on the basis of the larger-diameter tube portion. Therefore, the smaller-diameter tube portion can include a guiding portion formed integrally with the inner surface thereof for retaining or preventing the inclination of the smaller-diameter tube portion itself when the smaller-diameter tube portion sinks into the larger-diameter tube portion, and the guiding portion can be formed by expanding the folded-back portion of the smaller-diameter tube portion toward the inner surface of the larger-diameter tube portion.

The guiding portion is formed by expanding the folded-back portion of the smaller-diameter tube portion of the step portion having the S-shaped section smaller than the radius of the circular arc-shaped section of the folded-back portion of the larger-diameter tube portion toward the inner surface of the larger-diameter tube portion. Alternatively, the guiding portion is formed by expanding the folded-back portion of the smaller-diameter tube portion of the step portion having an S-shaped section joining the folded-back portion of the smaller-diameter tube portion and the folded-back portion of the larger-diameter tube portion toward the inner surface of the larger-diameter tube portion through an annular side surface. Each of the guiding portion can be brought into sliding contact with the inner surface of the larger-diameter tube portion while using the folded-back portion of the smaller-diameter tube portion as itself, when the smaller-diameter tube portion is reliably inserted into the larger-diameter tube portion.

DESCRIPTION OF THE PREFERRED EMBODIMENT

An embodiment of a shock absorber as being of a bumper supporting member will be described hereinafter with reference to the accompanying drawings.

Figure 1:
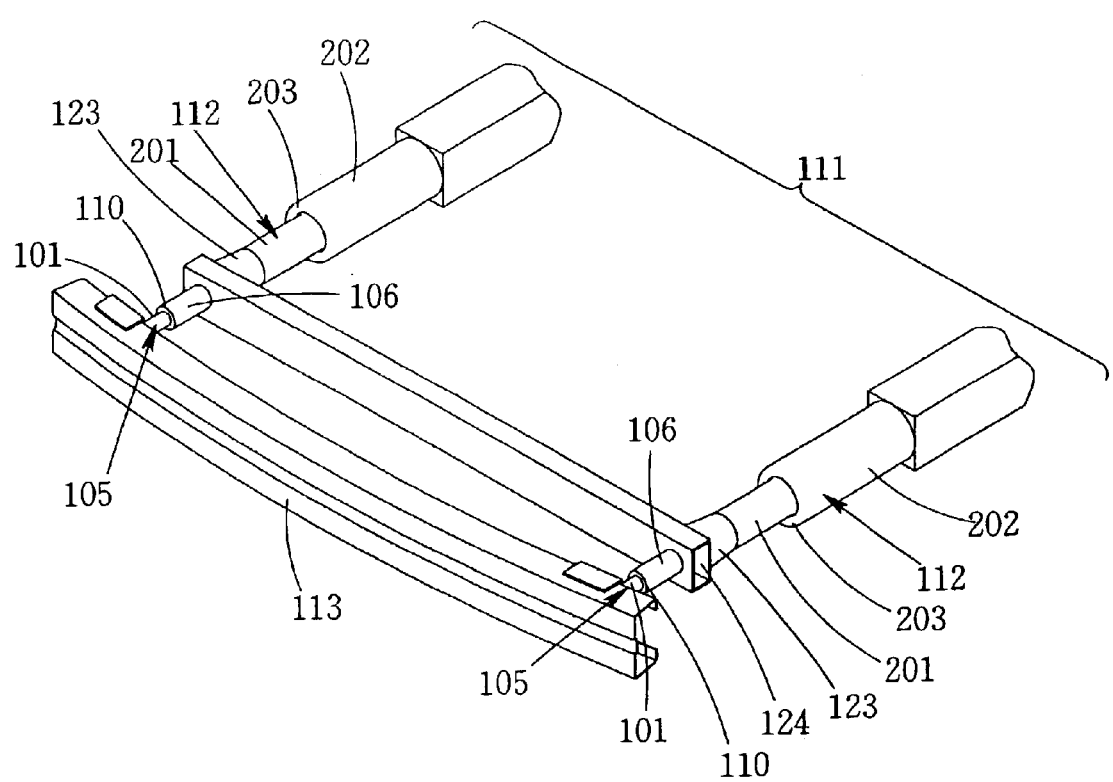
FIG. 1 is a perspective view showing the using modes of a shock absorber as being of a bumper supporting member and a shock absorber as being of a side member.
Figure 2:
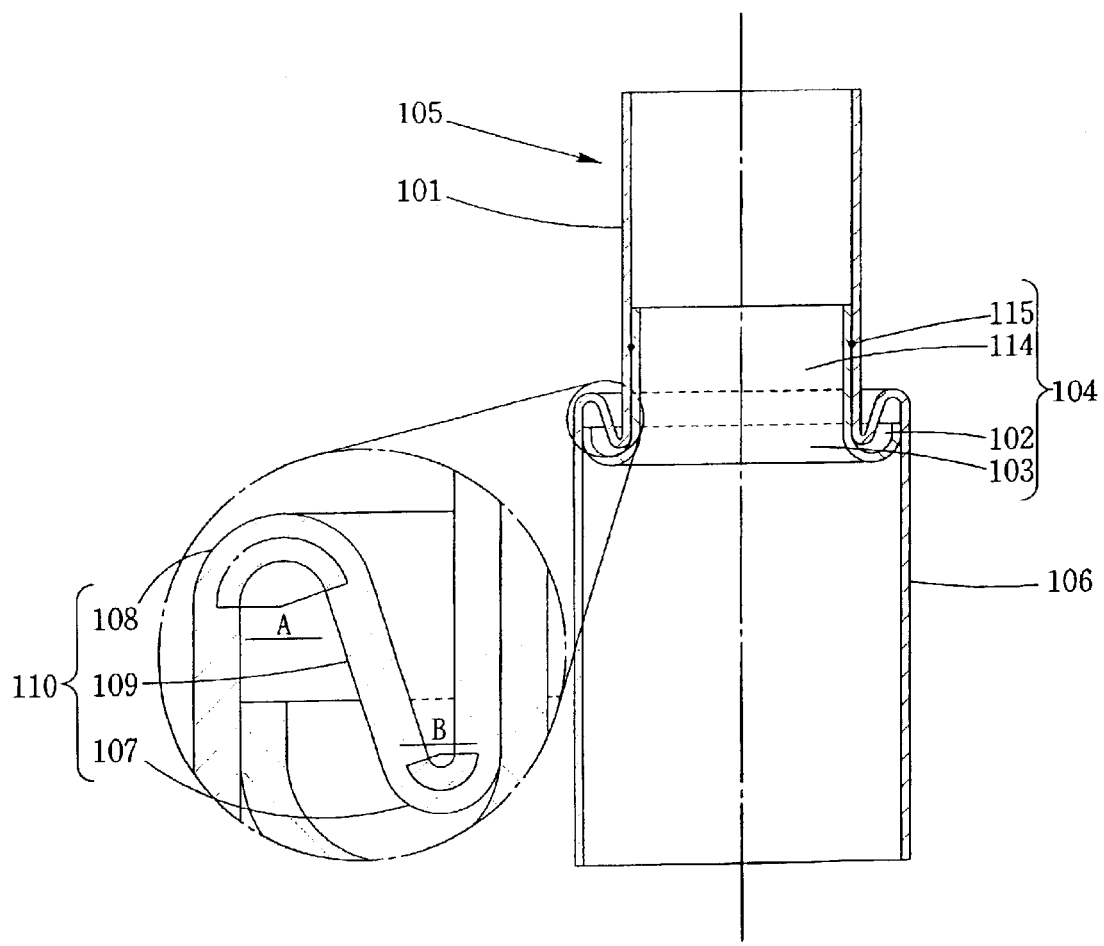
FIG. 2 is a sectional view of the shock absorber as the bumper supporting member, to which a guiding member having a larger-diameter annular guiding portion curled toward an smaller-diameter tube portion is attached, and an enlarged sectional view of the step portion.

A shock absorber 105 as being of a bumper supporting member of this embodiment has a two-step tubular structure comprising a smaller-diameter tube portion 101 and a larger-diameter tube portion 106 integrally formed through a step portion 110 by partially reducing or partially enlarging a diameter of a plastically deformable straight tube, as shown in FIG. 2. In this embodiment, the smaller-diameter tube portion 101 and the larger-diameter tube portion 106 are axially shrunken in the axial direction (as referred to a single-dotted line in FIG. 2 as in the following) to form a step portion 110 of an S-shaped section joining a folded-back portion 107 of the smaller-diameter tube portion having a section of a smaller radius B of curvature and a folded-back portion 108 of the larger-diameter tube portion having a section of a larger radius A of curvature by an annular side surface 109. The shock absorber 105 thus constructed is used, as shown in FIG. 1, in the mode where the larger-diameter tube portions 106, 106 are connected individually to the front edges of shock absorbers 112, 112 as being of a side member constructing a vehicle frame member 111 and where the smaller-diameter tube portions 101, 101 are installed to a bumper reinforcement 113.

A guiding member 104 for preventing inclination in this embodiment is constructed of a smaller-diameter annular guiding portion 114 having an external diameter equal to the internal diameter of the smaller-diameter tube portion 101, and a larger-diameter annular guiding portion 103 having an external diameter equal to the internal diameter of the larger-diameter tube portion 106. The larger-diameter annular guiding portion 103 has an annular outward-curled edge portion 102, which is formed by curling back the smaller-diameter annular guiding portion 114 protruding from the smaller-diameter tube portion 101 into the larger-diameter tube portion 106 toward the smaller-diameter tube portion 101 so much as to contact to the inner surface of the larger-diameter tube portion 106. The annular outward-curled edge portion 102 has an edge abutting against the inner surface of the larger-diameter tube portion 106 at a position over the step portion 110. This guiding member 104 is fixed by spot-welding (as indicated by a spot-welded trace 115 in FIG. 2) on the inner surface of the smaller-diameter tube portion 101.

Figure 3:
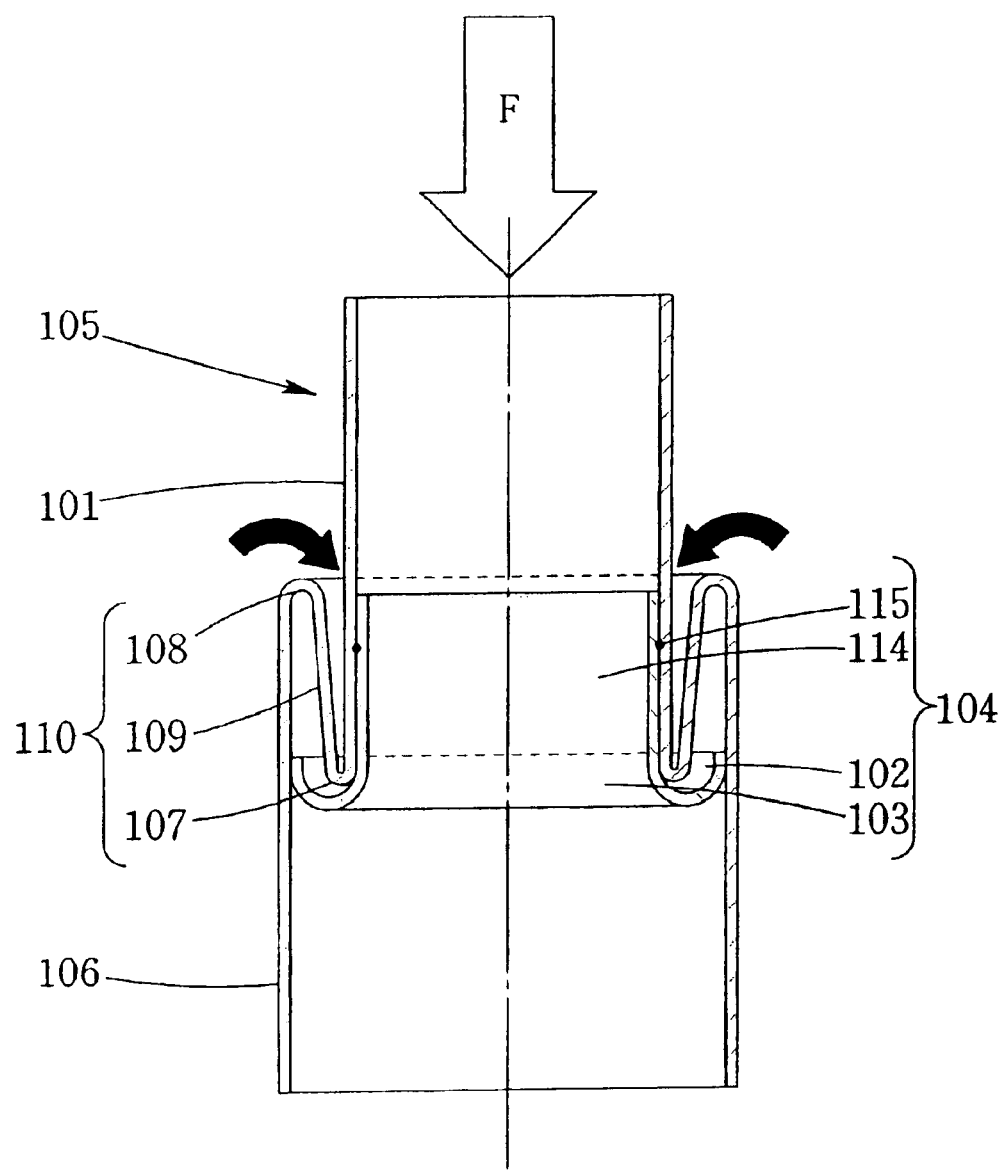
FIG. 3 is a sectional view similar to FIG. 2 but shows the step, at which an impact F in the axial direction begins to be applied to the shock absorber as the bumper supporting member.

When an impact F (as indicated by a blank arrow in FIG. 3) is applied in the axial direction to the smaller-diameter tube portion 101, the smaller-diameter tube portion 101 sinks into the larger-diameter tube portion 106, as shown in FIG. 3, so that the larger-diameter tube portion 106 is distorted (or plastically deformed, as indicated by solid arrows in FIG. 3) inward by the smaller-diameter tube portion 101 through the step portion 110 while extending the annular side surface 109 belonging to the step portion 110. As a result, the energy of the impact F is absorbed as the deformation energy of the larger-diameter tube portion 106. Here, the annular side surface 109 and the larger-diameter tube portion 106 are individually accompanied by the plastic deformation (or ductility), most of which is caused in the mode where the annular side surface 109 is extended according to the distortion of the larger-diameter tube portion 106.

In this embodiment, the folded-back portion 107 of the smaller-diameter tube portion across the step portion 110 has a circular arc-shaped section of a smaller radius B, and the folded-back portion 108 of the larger-diameter tube portion has a circular arc-shaped section of a larger radius A. Therefore, the folded-back portion 108 of the larger-diameter tube portion is plastically more deformable so that not the smaller-diameter tube portion 101 but only the larger-diameter tube portion 106 is distorted. Thus, the plastic deformation for absorbing the energy of the impact F is achieved exclusively by the distortion of the larger-diameter tube portion 106. As compared with another shock absorber of the same kind for the smaller-diameter tube portion 101 to be distorted, therefore, more impact energy can be absorbed.

In this embodiment, moreover, the folded-back portion 107 of the smaller-diameter tube portion and the folded-back portion 108 of the larger-diameter tube portion are joined by the annular side surface 109 to from a step portion 110 so that the annular side surface 109 to be extended while the smaller-diameter tube portion 101 sinks into the larger-diameter tube portion 106 is between the smaller-diameter tube portion 101 and the larger-diameter tube portion 106. This annular side surface 109 existing between the smaller-diameter tube portion 101 and the larger-diameter tube portion 106 has an action to prevent or restrain the inclination of the smaller-diameter tube portion 101. At the stage where the smaller-diameter tube portion 101 has sunk to some extent into the larger-diameter tube portion 106, as seen from FIG. 3, there is no apprehension that the smaller-diameter tube portion 101 will be inclined.

The problem is when the impact F is applied obliquely of the axial direction. The impact F applied obliquely of the axial direction can be divided, as seen from FIG. 4, into a longitudinal component fv (as indicated by a downward solid arrow in FIG. 4) to push the smaller-diameter tube portion 101 into the larger-diameter tube portion 106 and a transverse component fh (as indicated by a rightward solid arrow in FIG. 4) to incline the smaller-diameter tube portion 101.

Figure 4:
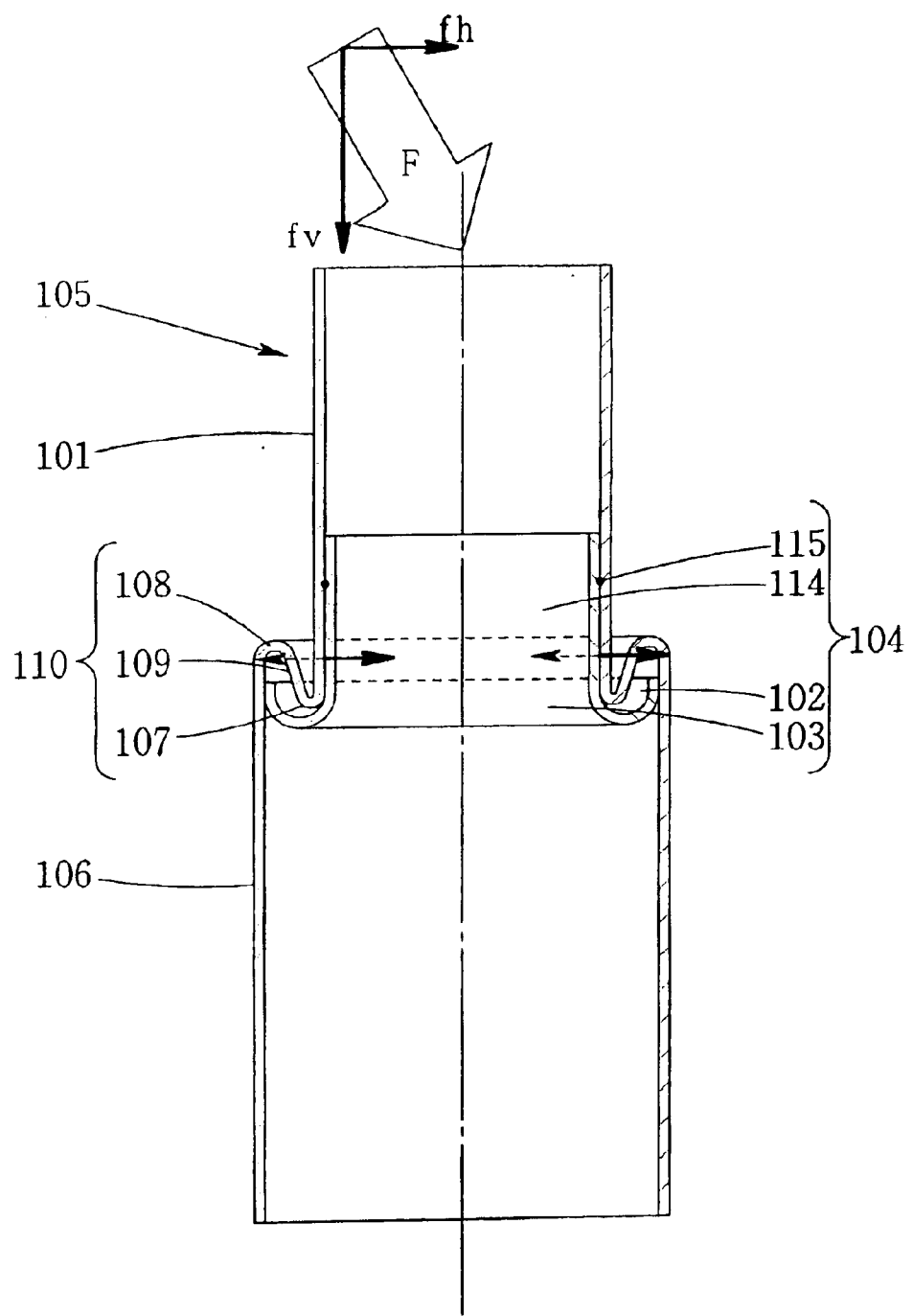
FIG. 4 is a sectional view similar to FIG. 2 but shows the step, at which an impact F begins to be applied obliquely of the axial direction to the shock absorber as the bumper supporting member.

For the smaller-diameter tube portion 101 to be inclined by the transverse component fh, the guiding member 104 prevents the folded-back portion 107 of the smaller-diameter tube portion from approaching the inner surface of the larger-diameter tube portion 106 (as referred to a solid arrow and a broken arrow on the righthand side of FIG. 4) on the upstream side of the transverse component fh and from leaving the inner surface of the larger-diameter tube portion 106 (as referred to a solid arrow and a broken arrow on the lefthand side of FIG. 4) on the downstream side of the transverse component fh.

These individual preventions are realized such that the larger-diameter annular guiding portion 103 abuts against the inner surface of the larger-diameter tube portion 106 so that the guiding member 104 is restricted in its freedom of motion in the direction of inclination of the smaller-diameter tube portion 101. In other words, a load for breaking the restriction in the freedom of motion requires an impact sufficient for entirely deforming the guiding member 104 to incline the smaller-diameter tube portion 101. In the guiding member 104, moreover, the smaller-diameter annular guiding portion 114 is fixed in contact with the smaller-diameter tube portion 101. and the annular outward-curled edge portion 102 composing the larger-diameter annular guiding portion 103 is hold in abutment against the larger-diameter tube portion 106. Therefore, the guiding member 104 is not deformed unless its entirety is deformed.

Moreover, the guiding member 104 of this embodiment is formed generally into a cylindrical shape so that the load needed for deforming the guiding member 104 can be handled no matter what direction the transverse component fh might be applied in to the smaller-diameter tube portion 101. By thus providing the guiding member 104 which has its smaller-diameter annular guiding portion 114 fixed on the inner surface of the smaller-diameter tube portion 101 and its larger-diameter annular guiding portion 103 abutting against the inner surface of the larger-diameter tube portion 106, it is possible to prevent the inclination (especially the inclination at the initial step where the impact F has begun to be applied) of the smaller-diameter tube portion 101.

When the smaller-diameter tube portion 101 sinks to some extent into the larger-diameter tube portion 106, as described above, the annular side surface 109 can prevent the inclination of the smaller-diameter tube portion 101. Even if the impact F is applied obliquely of the axial direction, therefore, the shock absorber 105 of the present invention can cause the smaller-diameter tube portion 101 reliably to sink without any inclination into the larger-diameter tube portion 106 to thereby absorb the energy of the impact F.

Figure 5:
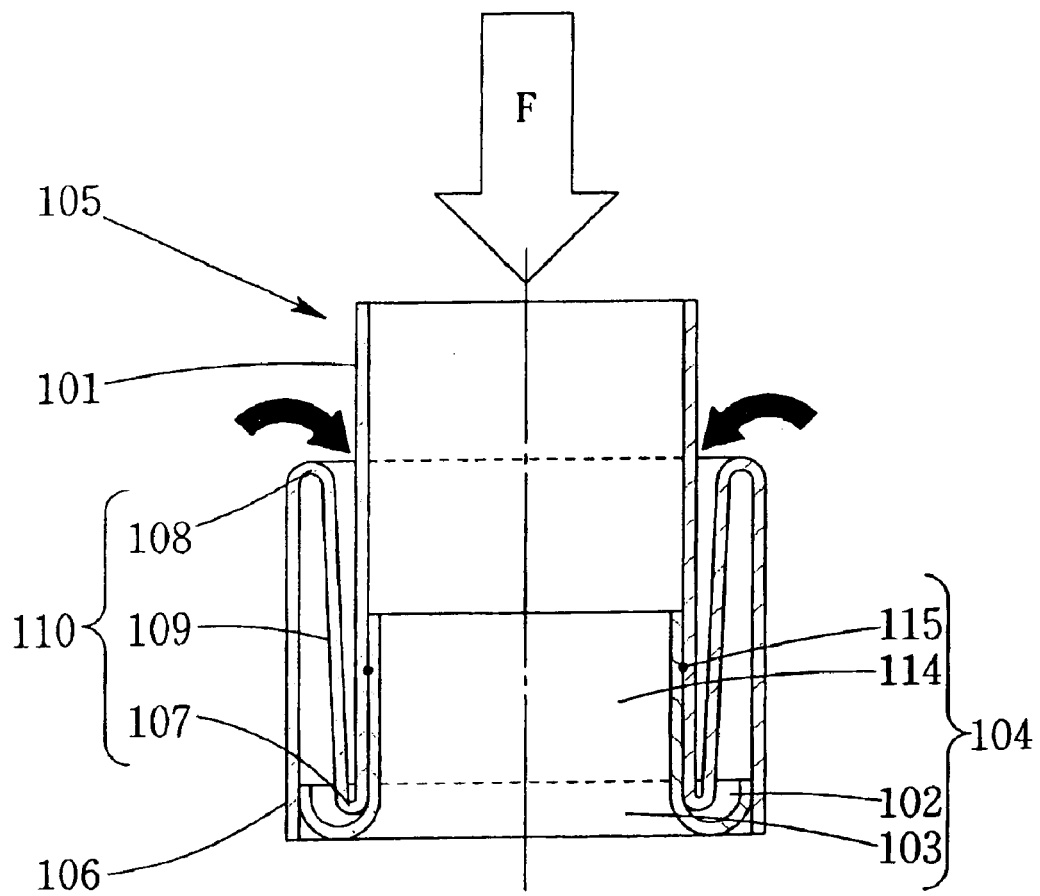
FIG. 5 is a sectional view similar to FIG. 2 but shows the step, at which the shock absorber as the bumper supporting member has absorbed the impact F in the axial direction.

The smaller-diameter tube portion 101 thus prevented from inclining can, as shown in FIG. 5, sinks into the larger-diameter tube portion 106 so deeply as the annular outward-curled edge portion 102 forming the larger-diameter annular guiding portion 103 of the guiding member 104 comes into abutment against the front edge (i.e., the position which lines with the edge of the larger-diameter tube portion 106, as referred to FIG. 1) of the shock absorber 112 of the side member. It is determined by the amount of sinking of the smaller-diameter tube portion how well the shock absorber of the bumper sporting member can absorb the energy of the impact F. If a hole for the guiding member to sink into is formed in the front edge of the side member, therefore, the smaller-diameter tube portion can sink more deeply. In this case, the foundation for the larger-diameter annular guiding portion to abut disappears from the edge of the larger-diameter tube portion. Therefore, it is advisable to form such a guide merging into the sinking hole that the larger-diameter annular guiding portion can continuously abut.

Figure 6:
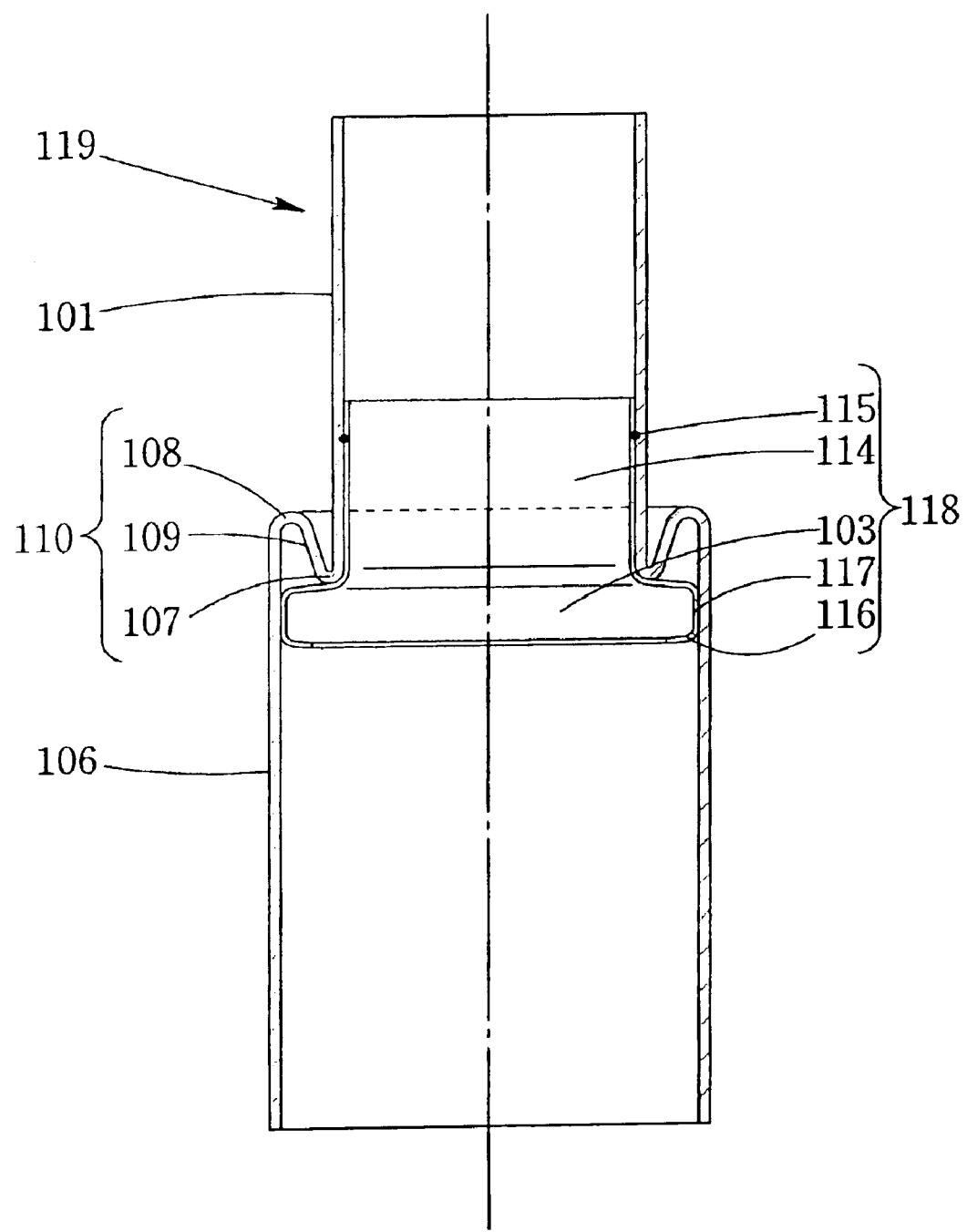
FIG. 6 is a sectional view similar to FIG. 2 but shows the shock absorber as the bumper supporting member, to which the guiding member having a larger-diameter annular guiding portion formed by a tubular ring portion and an annular folded-inward edge portion is attached.

The guiding member may have such a structure for preventing the inclination of the smaller-diameter tube portion as has the larger-diameter annular guiding portion capable of resisting to the transverse component fh of the impact F on the basis of the inner surface of the larger-diameter tube portion. In the structure of the larger-diameter annular guiding portion 103 of the guiding member 118 as the other embodiment, as shown in FIG. 6, the smaller-diameter annular guiding portion 114 protruding from the smaller-diameter tube portion 101 to the larger-diameter tube portion 106 is diametrically expanded to abut against the inner surface of the larger-diameter tube portion 106 thereby to form a tubular ring portion 117 to contact with the inner surface of the larger-diameter tube portion 106, and is folded inwardly to the direction of the radius of the larger-diameter tube portion 106 thereby to form an annular inward-curled edge portion 116.

The actions of the larger-diameter annular guiding portion 103 of this embodiment to prevent the inclination of the smaller-diameter tube portion 101 are not different from those of the aforementioned embodiment (as referred to FIG. 2 and other FIGS.). The tubular ring portion 117 contacts widely with the inner surface of the larger-diameter tube portion 106 acts to strengthen the forte to resist to the inclination of the smaller-diameter tube portion 101. In this embodiment, moreover, the annular inward-curled edge portion 116 extending from the tubular ring portion 117 is formed radially inward of the larger-diameter tube portion 106 so that the structural strength of the larger-diameter annular guiding portion 103 can be enhanced to prevent the inclination of the smaller-diameter tube portion better.

Figure 7:
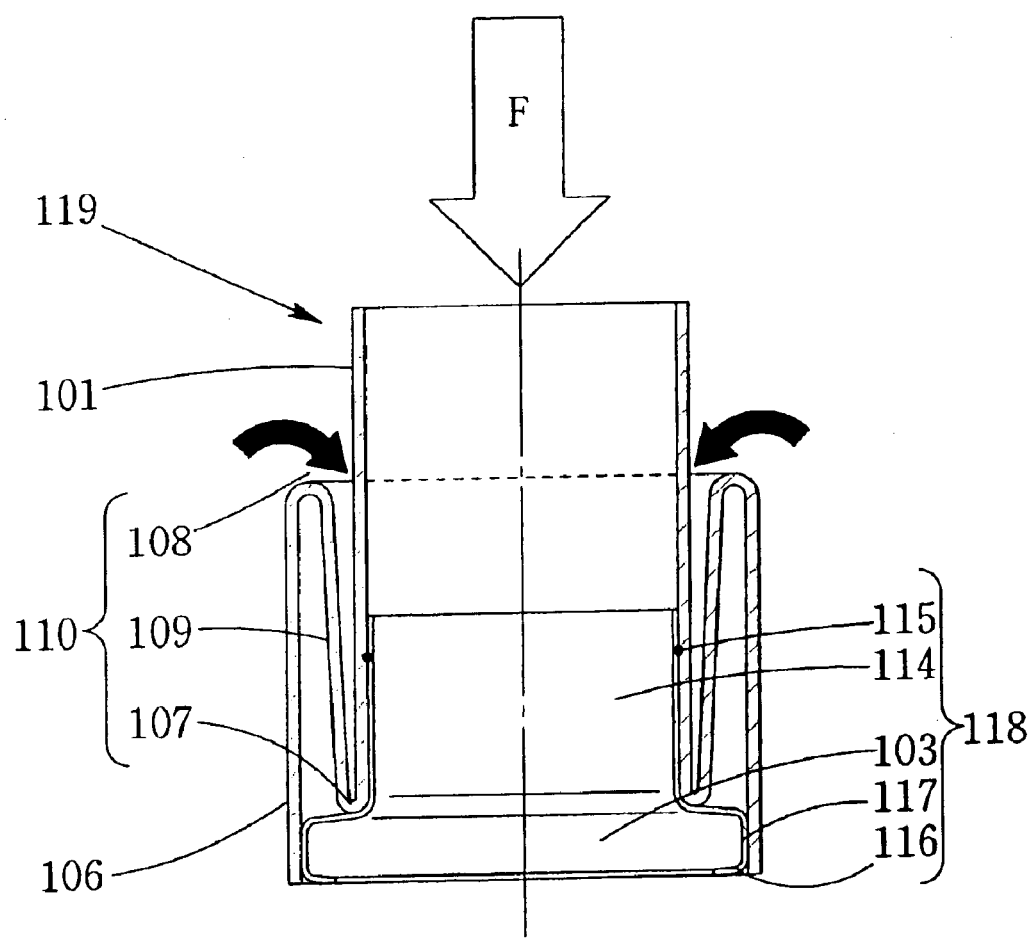
FIG. 7 is a sectional view similar to FIG. 6 but shows the step, at which the shock absorber as the bumper supporting member has absorbed the impact F in the axial direction.

Here, the larger-diameter annular guiding portion 103 containing the tubular ring portion 117 to have a width in the axial direction restricts the displacement of the folded-back portion 107 of the smaller-diameter tube portion 101 to sink into the larger-diameter tube portion 106 so that it reduces the sinking depth of the smaller-diameter tube portion 101 as shown in FIG. 7. In this case, if the annular inward-curled edge portion extending from the tubular ring portion is omitted, a plane of the larger-diameter annular guiding portion over the tubular ring portion may be allowed to be plastically deformed, so that the larger-diameter annular guiding portion 103 can be crushed with the folded-back edge portion of the smaller-diameter tube portion thereby to increase the sinking depth of the smaller-diameter tube portion.

Figure 8:
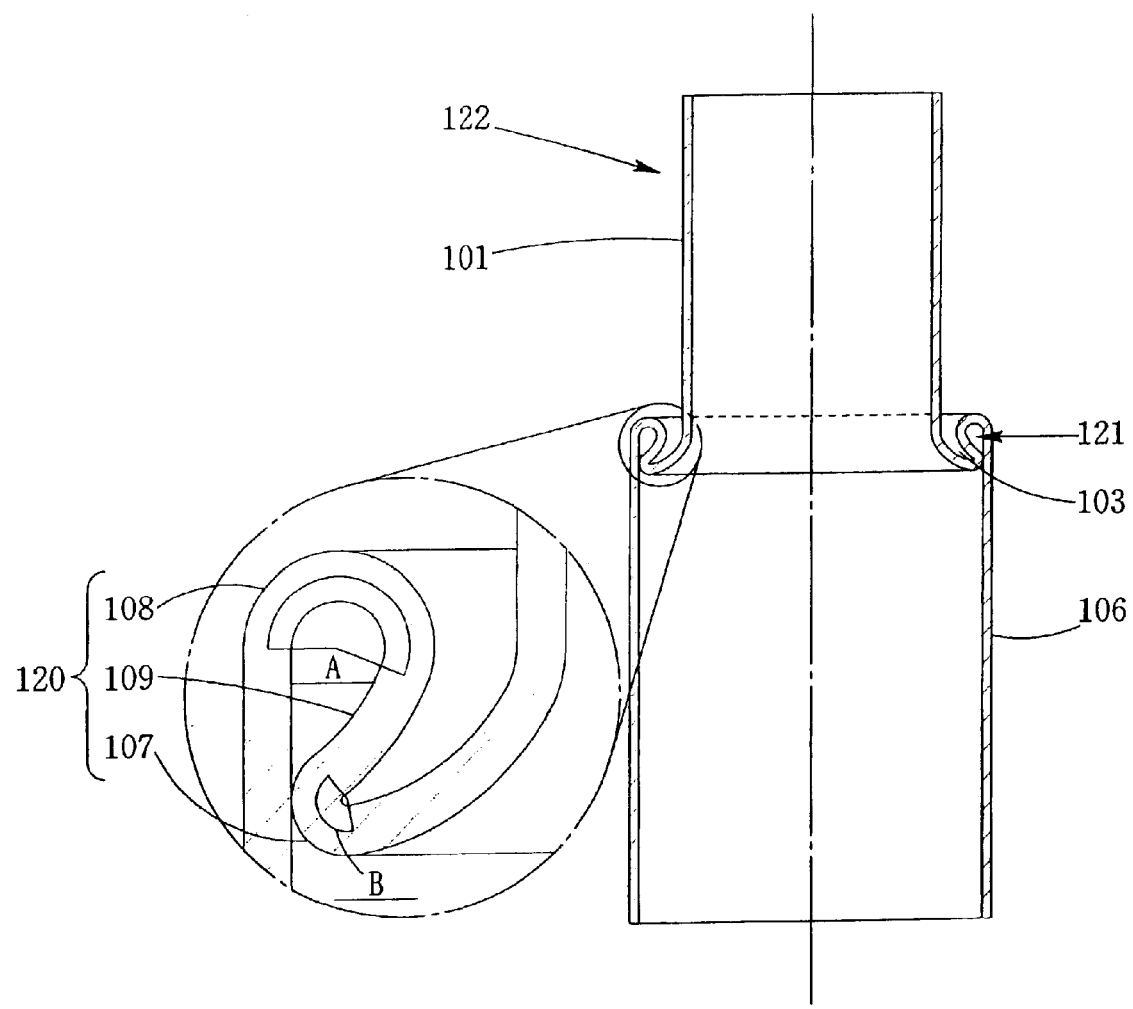
FIG. 8 is a sectional view similar to FIG. 2 but shows the shock absorber as the bumper supporting member having the guiding portion formed by expanding the side edge of the smaller-diameter tube portion, and an enlarged sectional view of the step portion.

The guiding member made separate from the shock absorber is preferable because it has high degrees of freedom for the design and manufacture, but requires an assembly step of fixing the smaller-diameter annular guiding portion, as integrated with the larger-diameter annular guiding portion, on the smaller-diameter tube portion. On the contrary, a guiding portion 121 seen in FIG. 8 is advantageous in that it does not need the assembly step of fixing the smaller-diameter annular guiding portion on the smaller-diameter tube portion, because only the larger-diameter annular guiding portion 103 is formed integrally with the smaller-diameter tube portion 101.

The guiding portion 121 of this embodiment is obtained by forming a step portion 120 joining the folded-back portion 107 of the smaller-diameter tube portion having a section of a smaller radius B of curvature and the folded-back portion 108 of the larger tube portion having a section of a larger radius A of curvature, and by expanding the folded-back portion 107 of the smaller-diameter tube portion to the inner surface of the larger-diameter tube portion 106. Although not opened upward, as seen in the foregoing individual embodiments, the annular side surface joining the folded-back portion 107 of the smaller-diameter tube portion and the folded-back portion 108 of the larger-diameter tube portion corresponds to an annular side surface 109 so that the inclination of the smaller-diameter tube portion 101 can be prevented with the guiding portion 121 integrally formed with the smaller-diameter tube portion 101.

Figure 9:
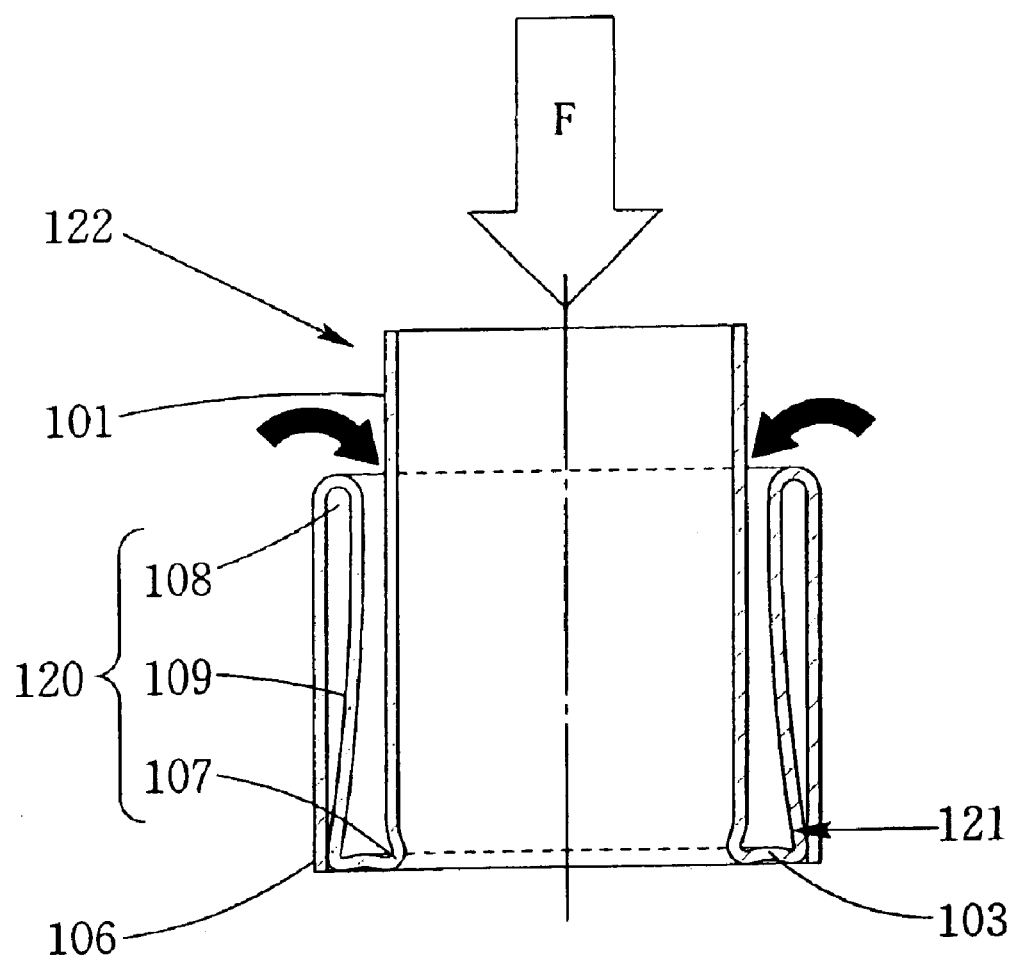
FIG. 9 is a sectional view similar to FIG. 8 but shows the step, at which the shock absorber as the bumper supporting member has absorbed the impact F in the axial direction.

The smaller-diameter tub; portion 101 sinks, when it receives the impact F in the axial direction, into the larger-diameter tube portion 106 while expanding its folded-back portion 107 toward the inner surface of the larger-diameter tube portion 106. This causes a certain sliding contact of the folded-back portion 107 of the smaller-diameter tube portion 101 with the inner surface of the larger-diameter tube portion 106 while the smaller-diameter tube portion 101 is sinking. The guiding portion 121 of this embodiment has a shape which expands in a gentle curvature from the smaller-diameter tube portion 101 to the folded-back portion 107 of the smaller-diameter tube portion 101. Therefore, when the smaller-diameter tube portion 101 comes at its lower end to the front edge of the shock absorber 112 of the side member (i.e., the position which lines with the edge of the larger-diameter tube portion 106, as referred to FIG. 1), the smaller-diameter tube portion 101 is plastically deformed from its folded-back portion 107, as shown in FIG. 9 and stops the sinking motion after it was slightly expanded.

Next, the embodiment of a shock absorber as a side member will be described with reference to the accompanying drawings.

Figure 10:
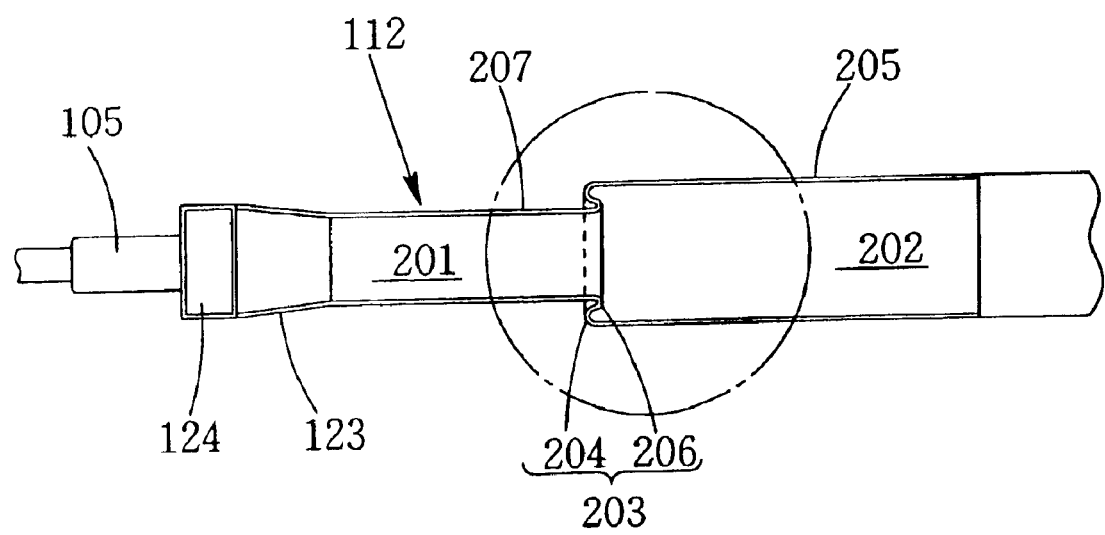
FIG. 10 is an axial sectional view of a shock absorber as being of a side member.
Figure 11:
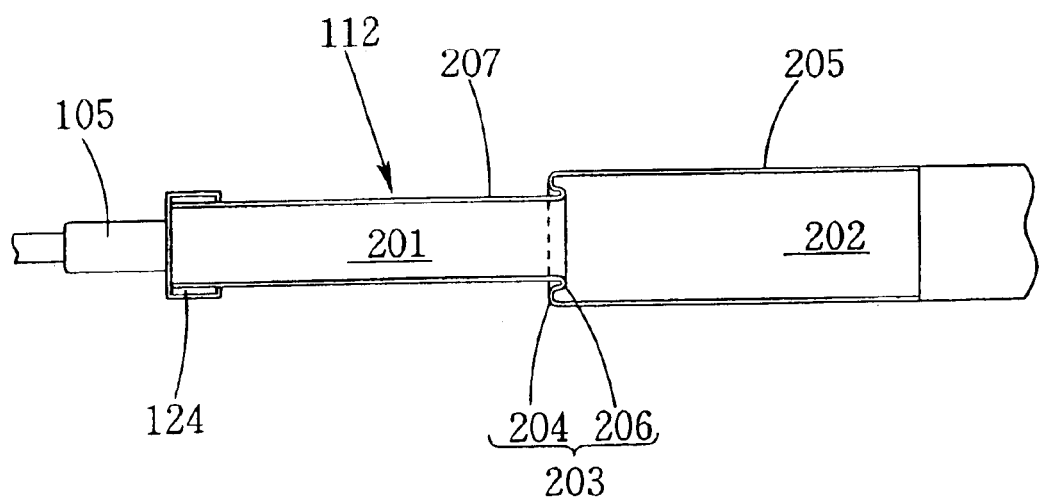
FIG. 11 is an axial sectional view of another embodiment of the shock absorber as the side member.

In this embodiment, as shown in FIG. 1 and FIG. 10, the vehicle frame member 111 is constructed by spanning a cross member 124 between expanded installation noses 123, 123 of smaller-diameter tube portions 201, 201 of the shock absorber 112 as the side member. The bumper reinforcement 113 is supported by the shock absorbers 105, 105, which are protruded from the cross member 124 coaxially in individual smaller-diameter tube portions 201 of the shock absorber 112. To enhance the joint strength between the cross member 124 and the shock absorber 112 as the side member, the installation noses 123, 123 of the smaller-diameter tube portions are expanded. Alternatively, the cross member 124 opening at its rear portion as shown in FIG. 11 is also available to join the smaller-diameter tube portions 201, 201 being installed thereto.

Figure 12:
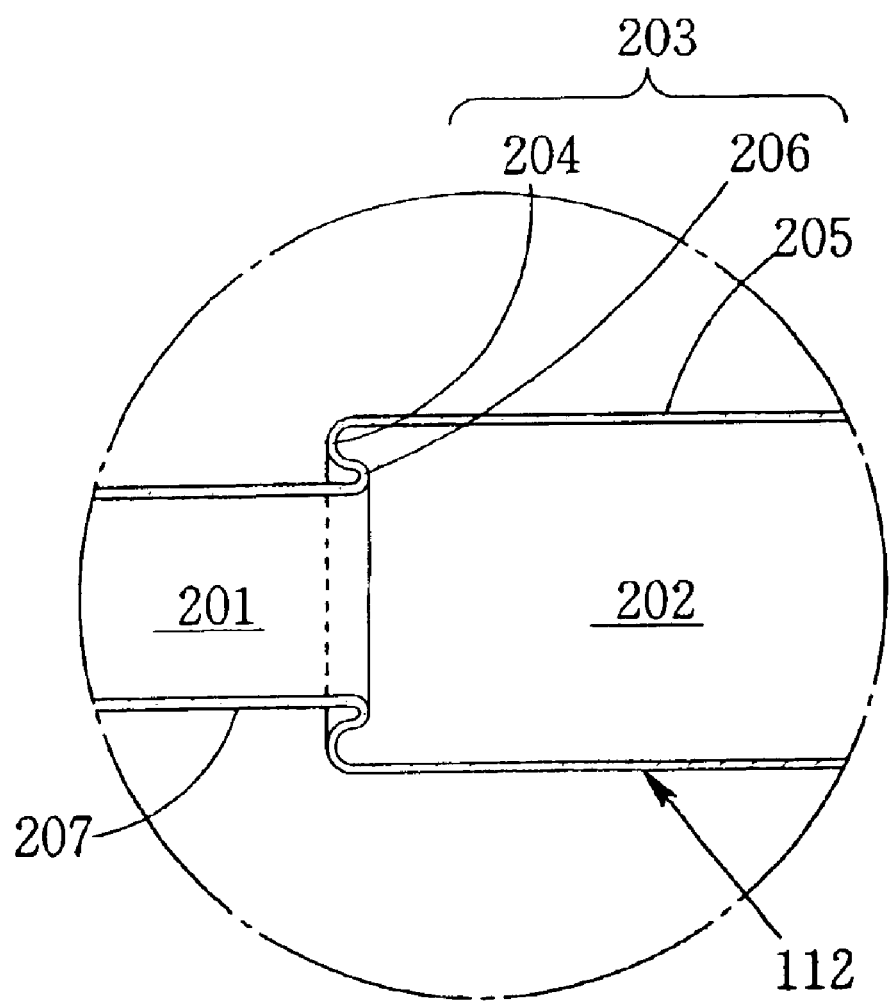
FIG. 12 is an enlarged sectional view of the shock absorber as the side member encircled in FIG. 10.

The present invention provides the shock absorber 112 as a side member having a step portion 203 connecting the folded-back portions 206 and 204 in order to ensure the plastic deformation of the step portion 203 generating from the folded-back portion 204 to the side surface 205 of the larger-diameter tube portion. Each of the folded-back portion 206 of the smaller-diameter tube portion and the folded-back portion 204 of the larger-diameter tube portion comprises that the circular arc-shaped sections having radius in 180 degrees are continuously formed from a side surface 207 of the smaller-diameter tube portion 201 and a side surface 205 of the larger-diameter tube portion 202, as shown in FIG. 12.

Especially in this embodiment, the radius of the circular arc-shaped section of the folded-back portion 204 of the larger-diameter tube portion is made about 1.7 times as large as that of the folded-back portion 206 of the smaller-diameter tube portion. According to this radius ratio, as apparent from FIG. 12, the folded-back portion 206 of the smaller-diameter tube portion is folded back in relatively steep angle and the folded-back portion 204 of the larger-diameter tube portion merges gently into the side surface 205 of the lager-diameter tube portion relatively.

The smaller-diameter tube portion 201 and the larger-diameter tube portion 202 are jointed through the aforementioned step portion 203 so that the smaller-diameter tube portion 201 has a smaller external diameter than the internal diameter of the larger-diameter tube portion 202. If the impact F is applied in the axial direction of the shock absorber 112 as the side member, as shown in FIG. 13, the smaller-diameter tube portion 201 sinks into the larger-diameter tube portion 202 after or almost simultaneously that the shock absorber 105 as the bumper supporting member has been absorbed (e.g., the shock absorption by the plastic deformation in this embodiment).

Figure 13:
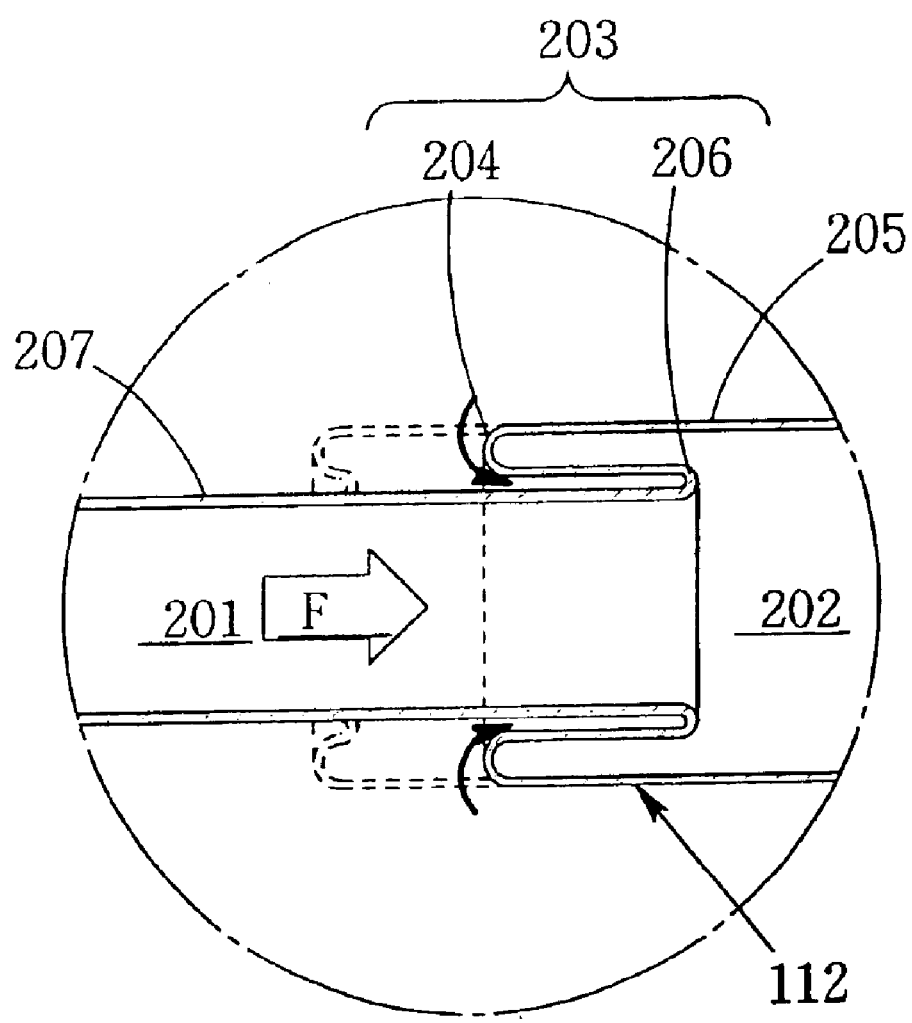
FIG. 13 is a sectional view similar to FIG. 12 but shows the process in which the smaller-diameter tube portion is absorbed into the larger-diameter tube portion.

This sinking motion of the smaller-diameter tube portion into the larger-diameter tube portion is mainly based on the plastic deformation of the larger-diameter tube portion generating from the folded-back portion to the side surface of the larger-diameter tube portion (as referred to thick arrows in FIG. 13). This is caused by the side surface 205 of the larger-diameter tube portion having a thinner wall thickness than that of the side surface 207 of the smaller-diameter tube portion obtained by partially enlarging (or partially reducing) the straight tube, and thereby the larger-diameter tube portion 202 becomes more plastically deformable than the smaller-diameter tube portion 201. This plastic deformation is advantageous for realizing the stable absorption of a high impact energy, because it is continuously generated by turning the side surface 205 of the larger-diameter tube portion into the larger-diameter tube portion.

In order to prevent the inclination of the smaller-diameter tube portion 201 when the impact F is obliquely applied, it is advisable to form the step portion 203 joining the folded-back portion 206 of the smaller-diameter tube portion and the folded-back portion 204 of the larger-diameter tube portion through an annular side surface 208.

Figure 14:
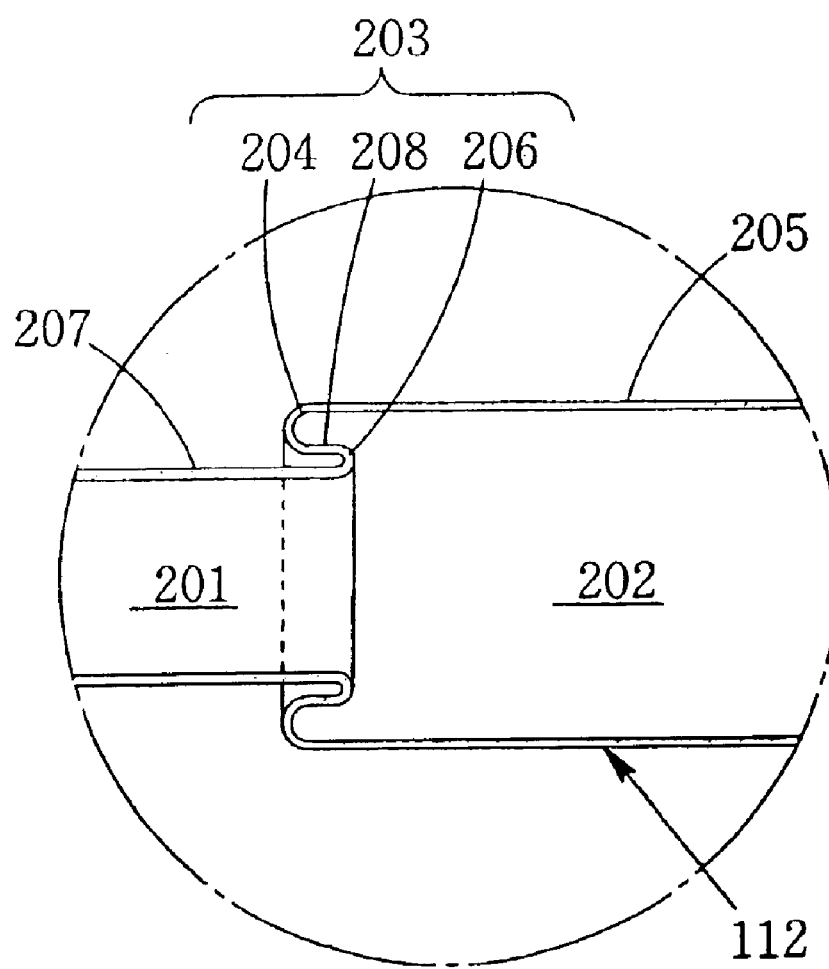
FIG. 14 is a sectional view similar to FIG. 12 but shows a shock absorber as a side member, in which the side edge of the annular smaller-diameter tube portion and the side edge of the annular larger-diameter tube portion are joined through the annular side surface of the tubular ring portion.

In the shock absorber 112 as the side member of this embodiment, as shown in FIG. 14, the folded-back portion 206 of the smaller-diameter tube portion is formed at a spacing in the sinking direction of the smaller-diameter tube portion 201 from the folded-back portion 204 of the larger-diameter tube portion having a relatively larger radius, thereby to form the step portion 203 joining the folded-back portion 206 of the smaller-diameter tube portion and the folded-back portion 204 of the larger-diameter tube portion through an annular side surface 208.

Figure 15:
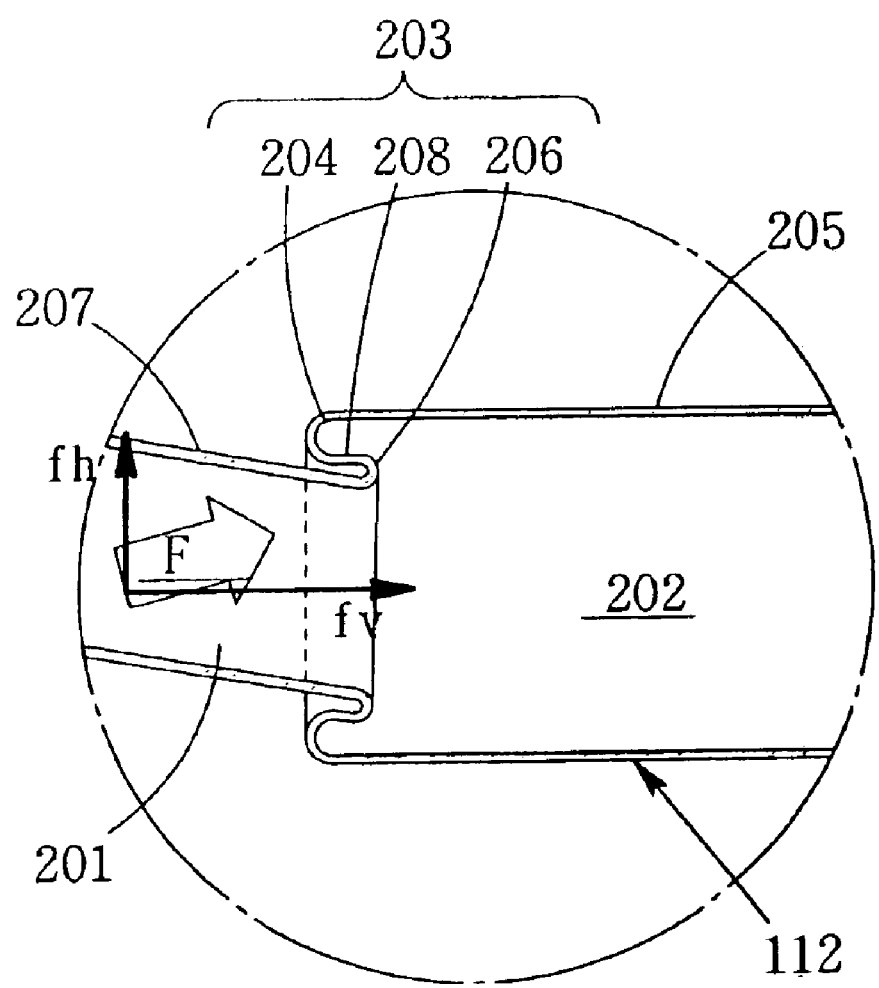
FIG. 15 is a sectional view similar to FIG. 14 but shows the state, in which the smaller-diameter tube portion is slightly inclined by receiving the impact F obliquely.

The smaller-diameter tube portion 201 does not have its side surface 207 closed to contact with the annular side surface 208. Therefore, when the impact F is applied obliquely of the axial direction of the shock absorber 112 as the side member, the side surface 207 of the smaller-diameter tube portion is inclined so much as to abut, while using the folded-back portion 206 of the smaller-diameter tube portion as the inclination axis, against the annular side surface 208 or the folded-back portion 204 of the larger-diameter tube portion, as seen from FIG. 15. However, this inclination of the smaller-diameter tube portion 201 is regulated when the side surface 207 of the smaller-diameter tube portion abuts against the annular side surface 208 or the folded-back portion 204 of the larger-diameter tube portion.

Figure 16:
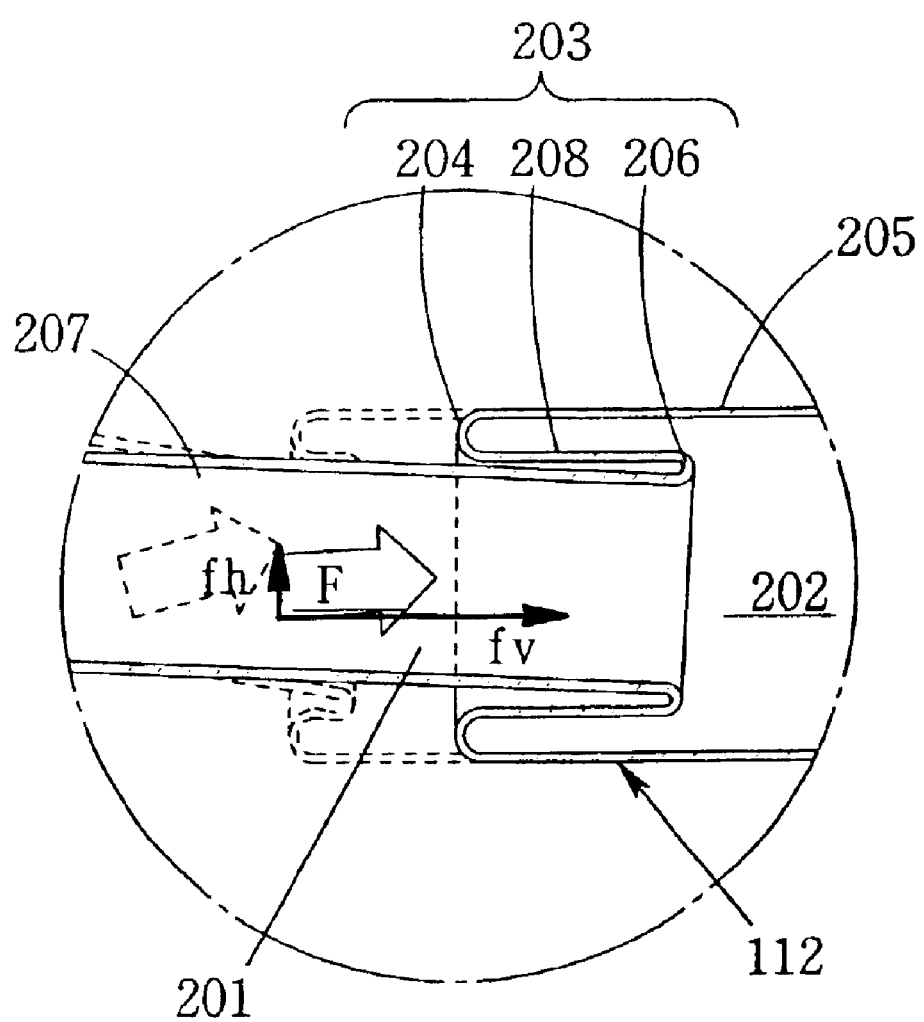
FIG. 16 is a sectional view similar to FIG. 14 but shows the process, in which the application of the impact F is continued so that the smaller-diameter tube portion is absorbed into the larger-diameter tube portion while correcting its inclination.

When the impact F is further applied, the transverse component fh of the impact F perpendicular to the axis of the shock absorber 112 as the side member is received by the annular side surface 208 so that it cannot advance the inclination of the smaller-diameter tube portion 201 any more. As seen from FIG. 16, only the axial component fv of the impact F in the axial direction of the shock absorber 112 as the side member contributes to the action for absorbing the smaller-diameter tube portion 201 into the larger-diameter tube portion 202.

The inclination of the smaller-diameter tube portion uses the folded-back portion of the smaller-diameter tube portion as its axis so that the inclination is restricted to the range of the folded-back portion of the smaller-diameter tube portion over the annular side surface or the circular arc-shaped section of the folded-back portion of the larger-diameter tube portion. Accordingly, at the stage where the smaller-diameter tube portion 201 is sinking into the larger-diameter tube portion 202, the smaller-diameter tube portion 201 is temporarily corrected in its inclination while having its side surface 207 in sliding contact with the annular side surface 208 or the circular arc-shaped section of the folded-back portion 204 of the larger-diameter tube portion, so that the impact F can contribute to only the plastic deformation to turn the side surface 205 of the larger-diameter tube portion inward from the step portion 203.

The annular side surface 208 needs not to be parallel to the side surface 207 of the smaller-diameter tube portion or the side surface 205 of the larger-diameter tube portion.

Figure 17:
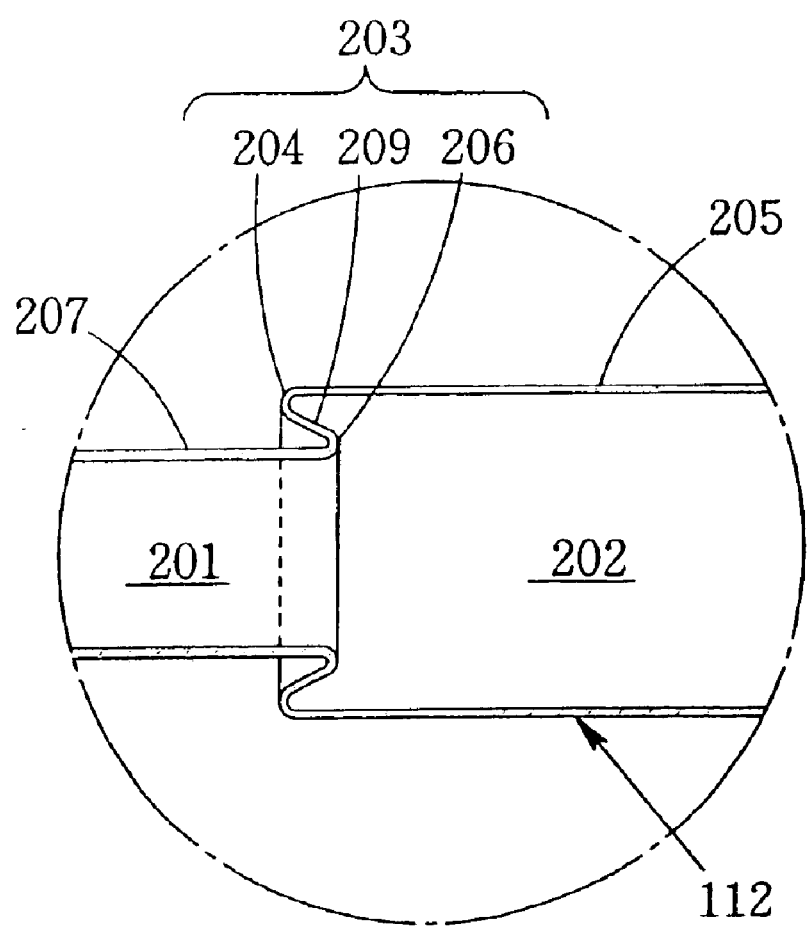
FIG. 17 is a sectional view similar to FIG. 12 but shows a shock absorber as being of a side member, in which a conical annular side surface is formed.
Figure 18:
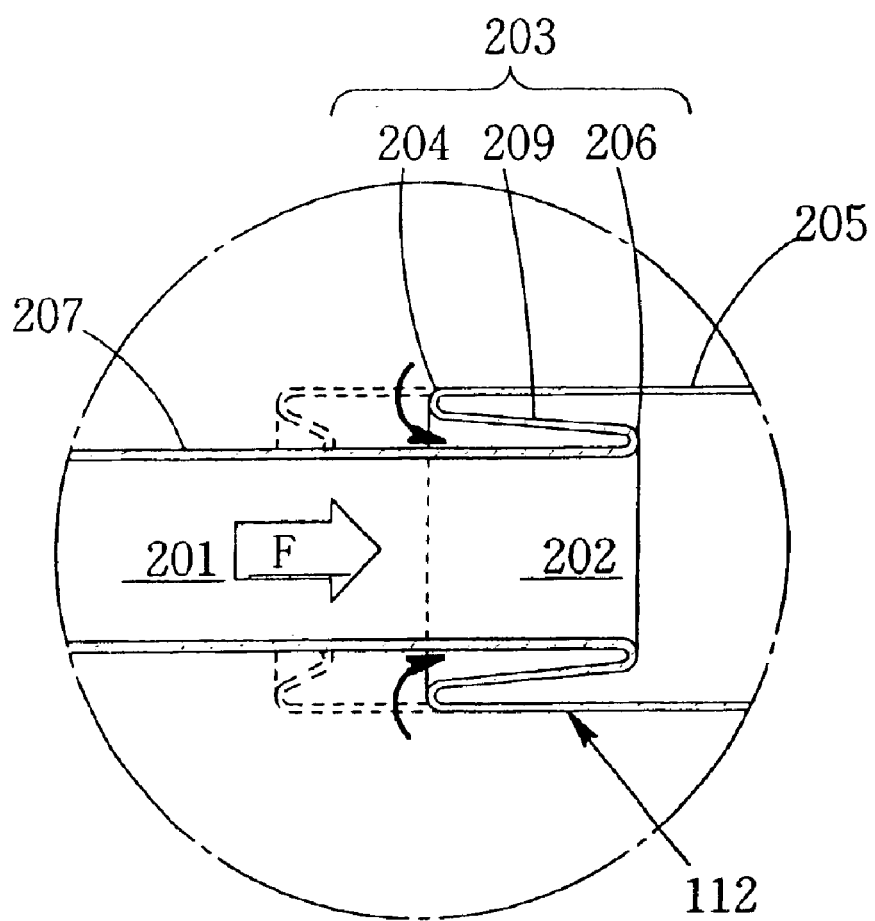
FIG. 18 is a sectional view similar to FIG. 17 but shows the state, in which the smaller-diameter tube portion is absorbed into the larger-diameter tube portion by receiving the impact F applied.

The annular side surface 208 prevents the inclination of the smaller-diameter tube portion directly by contacting with the side surface of the smaller-diameter tube portion to be inclined or indirectly by separating the circular arc-shaped section of the folded-back portion of the smaller-diameter tube portion acting as the inclination axis from the circular arc-shaped section of the folded-back portion of the larger-diameter tube portion to regulate the inclination angle. Accordingly, the shape of the annular side surface is not important, as long as the aforementioned function for preventing the inclination thereof can be exhibited. Even a conical annular side surface 209, as seen in FIG. 17 and FIG. 18, can achieve absorption of the smaller-diameter tube portion 201 into the larger-diameter tube portion 202 smoothly.

The shock absorber of the present invention is enabled by specifying the shape of the step portion or by adding the guiding member to retain the sinking motion of the smaller-diameter tube portion into the larger-diameter tube portion even if it is subjected to an axially oblique impact of a larger angle than that of the related art, so that it can sufficiently exhibit the shock absorbing performance to absorb the impact energy as the deformation energy for the plastic deformation.

The smaller-diameter tube portion in the related art is prevented from inclining up to an inclination angle of about 30 degrees with respect to the axial direction. However, the shock absorber as the bumper supporting member in the present invention can retain the sinking motion of the smaller-diameter the portion into the larger-diameter tube portion within a range up to an inclination angle of 45 degrees, at which the transverse component flu exceeds the longitudinal component fv, with respect to the axial direction. The guiding member/portion has an erect to prevent or retain the inclination of the smaller-diameter tube pardon with the simple structure.

The present invention provides a shock absorber as being of a bumper supporting member, which includes tube portions supporting the bumper reinforcement of a vehicle to the vehicle frame members, and a shock absorber as being of a side member, which includes tube portions constructing the side portions of the vehicle frame members. The shock absorber of the side member can be bent at a step portion to avoid jeopardy, in which it might otherwise contact with the vehicle frame or the fuel tank, thereby proving the additional effect of an improvement in the safety.

What is claimed is:

1. A shock absorber comprising a smaller-diameter tube portion and a larger-diameter tube portion integrally formed by partially reducing or partially enlarging a plastically deformable straight tube, and a step portion that joins the smaller-diameter tube portion and the larger-diameter tube portion, wherein the smaller-diameter tube portion includes a guiding member fixed on its inner surface for retaining or preventing the inclination of the smaller-diameter tube portion when the smaller-diameter tube portion sinks into the larger-diameter tube portion, the guiding member has a smaller-diameter annular guiding portion having an external diameter equal to the internal diameter of the smaller-diameter tube portion and a larger-diameter annular guiding portion having an external diameter equal to the internal diameter of the larger-diameter tube portion, the smaller-diameter annular guiding portion is fixed on the inner surface of the smaller-diameter tube portion and protruding across the step portion from the smaller-diameter tube portion into the larger-diameter tube portion, and the larger-diameter annular guiding portion contacts the inner surface of the larger-diameter tube portion at a position where the smaller-diameter annular guiding portion crosses the step portion.

2. The shock absorber according to claim 1, wherein the step portion is formed to have an S-shaped section, in which the radius of a circular arc-shaped section of the folded-back portion of the smaller-diameter tube portion is made smaller than that of a circular arc-shape section of the folded-back portion of the larger-diameter tube portion.

3. The shock absorber according to claim 1, wherein the step portion is formed to have an S-shaped section by joining folded-back portion of the smaller-diameter tube portion and a folded-back portion of the larger-diameter tube portion through an annular side surface.

4. The shock absorber according to claim 1, wherein the guiding member forms the larger-diameter annular guiding portion by partially enlarging the smaller-diameter annular guiding portion protruding from the smaller-diameter tube portion into the larger-diameter tube portion much as to abut against the inner surface of the larger-diameter tube portion.

* * * * *